(12) United States Patent
Liu et al.

(10) Patent No.: US 10,370,249 B2
(45) Date of Patent: Aug. 6, 2019

(54) METHOD AND SYSTEM FOR PRODUCING DEUTERIUM DEPLETED WATER

(71) Applicants: Hongjian Liu, Luoyang (CN); Heng Gao, Luoyang (CN)

(72) Inventors: Hongjian Liu, Luoyang (CN); Heng Gao, Luoyang (CN)

(*) Notice: Subject to any disclaimer, the term of this patent is extended or adjusted under 35 U.S.C. 154(b) by 136 days.

(21) Appl. No.: 15/313,432

(22) PCT Filed: May 23, 2015

(86) PCT No.: PCT/CN2015/079640
§ 371 (c)(1),
(2) Date: Nov. 22, 2016

(87) PCT Pub. No.: WO2015/180592
PCT Pub. Date: Dec. 3, 2015

(65) Prior Publication Data
US 2017/0137287 A1   May 18, 2017

(30) Foreign Application Priority Data

May 26, 2014 (CN) .......................... 2014 1 0224282
May 26, 2014 (CN) ..................... 2014 2 0271126 U

(51) Int. Cl.
*C01B 5/00* (2006.01)
*C02F 1/00* (2006.01)
(Continued)

(52) U.S. Cl.
CPC .................. *C01B 5/00* (2013.01); *C02F 9/00* (2013.01); *C25B 1/04* (2013.01); *C25B 1/10* (2013.01);
(Continued)

(58) Field of Classification Search
None
See application file for complete search history.

(56) References Cited

U.S. PATENT DOCUMENTS 4,058,440 A * 11/1977 Valfells .................... C01B 3/061
                                                           205/345
5,484,512 A * 1/1996 Sasaki ...................... C01B 3/56
                                                          204/232
(Continued)

FOREIGN PATENT DOCUMENTS

CA      103979495 A       8/2014
CN      102398894 A  *    4/2012
(Continued)

OTHER PUBLICATIONS

The World Intellectual Property Organization (WIPO) International Search Report for PCT/CN2015/079640 dated Aug. 27, 2015 pp. 1-3.

*Primary Examiner* — Melissa S Swain
(74) *Attorney, Agent, or Firm* — Millburn IP PLLC

(57) ABSTRACT

The present disclosure provides a system and a method for producing deuterium depleted water. The system includes a chlor-alkali electrolysis cell, a compressor, a cooling water scrubber tower, a hydrogen combustor, a boiler, a cooling condensation apparatus, a crude deuterium depleted water storage tank, a water purification apparatus and a water filling machinery. The method includes: generating hydrogen from a chlor-alkali electrolysis of salt water in the chlor-alkali electrolysis cell; increasing the pressure of the generated hydrogen; purifying and cryogenically cooling the generated hydrogen; combusting the mixture of hydrogen and oxygen to generate water steam; condensing the water steam to produce the crude deuterium depleted water in the cooling condensation apparatus; storing the produced crude deuterium depleted water in the crude deuterium depleted water storage tank; purifying the produced crude deuterium depleted water through the water purification apparatus; packaging the purified deuterium depleted water with the water filling machinery.

9 Claims, 2 Drawing Sheets

(51) Int. Cl.
*C25B 1/10* (2006.01)
*C25B 15/08* (2006.01)
*C25B 1/34* (2006.01)
*C25B 1/04* (2006.01)
*C02F 9/00* (2006.01)
C02F 101/00 (2006.01)
C02F 1/28 (2006.01)
C02F 1/44 (2006.01)
C02F 1/469 (2006.01)
C02F 103/02 (2006.01)

(52) U.S. Cl.
CPC ............... *C25B 1/34* (2013.01); *C25B 15/08* (2013.01); *C02F 1/004* (2013.01); *C02F 1/283* (2013.01); *C02F 1/441* (2013.01); *C02F 1/444* (2013.01); *C02F 1/4695* (2013.01); *C02F 2101/006* (2013.01); *C02F 2103/026* (2013.01); *C02F 2303/00* (2013.01); *C02F 2303/185* (2013.01); *Y02E 60/366* (2013.01)

(56) References Cited

U.S. PATENT DOCUMENTS

| | | | | |
|---|---|---|---|---|
| 2005/0109604 A1* | 5/2005 | Zlotopolski | .......... | B01D 35/009 203/10 |
| 2012/0058197 A1* | 3/2012 | Somlyai | .................... | A23L 2/52 424/600 |

FOREIGN PATENT DOCUMENTS

| | | | | |
|---|---|---|---|---|
| CN | 102398894 A | 4/2012 | | |
| CN | 103848399 A | 6/2014 | | |
| CN | 203833608 U | 9/2014 | | |
| RO | 121638 B1 * | 1/2008 | ............... | B01D 3/14 |
| WO | WO-9633129 A1 * | 10/1996 | ............... | C01B 3/08 |

* cited by examiner

METHOD AND SYSTEM FOR PRODUCING DEUTERIUM DEPLETED WATER

CROSS-REFERENCES TO RELATED APPLICATIONS

This PCT application is a national phase entry under 35 U.S.C. § 371 of International Application No. PCT/CN2015/079640, filed on May 23, 2015, which claims priority of Chinese Patent Application Numbers: CN201410224282.3 and CN201420271126.8, both filed on May 26, 2014, the entire contents of all of which are incorporated by reference herein.

FIELD OF THE INVENTION

The present invention generally relates to the field of stable isotope techniques and, more particularly, relates to a method and system for producing deuterium depleted water using by-product hydrogen generated from a chlor-alkali process in mass production.

BACKGROUND

Deuterium depleted water (DDW), known as super light water, is a type of high-end drinkable water with a reduced deuterium concentration by using state-of-the-art deuterium isotope separation technology. Currently, deuterium depleted water has been widely used in Europe, Japan and other developed countries for cancer therapy, health care, beauty care, etc. Deuterium depleted water is also well-known as "cellular nutrition water" or "water of life".

Nature water is composed of two hydrogen atoms and one oxygen atom. Hydrogen element has three stable isotopes which are respectively Protium (Hydrogen-1, $^1H$) having an atomic mass number of 1, Deuterium (D or $^2H$, also known as heavy hydrogen) having an atomic mass number of 2, and Tritium ($^3H$) having an atomic mass number of 3. Deuterium typically has a concentration of about 150 ppm in the nature water. Water with a deuterium concentration of less than 150 ppm is considered as deuterium depleted water. Research shows water with high levels of deuterium has an adverse effect to the growth, development and reproduction of the living organisms. The drinking water with lower concentration of deuterium may provide many benefits to human health. The lower the deuterium concentration the water contains, the more beneficial effect on human health can be obtained.

One of the natural sources of deuterium depleted water is glacier water. It has a deuterium concentration of 135 ppm, which, however, is not significantly lower than the deuterium concentration (150 ppm) in ordinary water. In addition, glacier is generally far away from the living habitats of human. Obtaining glacier water is very expensive due to the high costs of glacier mining and transportation. Therefore glacier water has not been widely developed and used for mass production of deuterium depleted water.

Water rectification has been specifically recognized as one of the conventional methods for producing deuterium depleted water based on differences in boiling point of water and heavy water. However, because of the small differences in boiling point of water and heavy water, high energy consumption is required for producing deuterium depleted water. No mass production of deuterium depleted water is therefore provided by water rectification. Currently, only limited amount of deuterium depleted water can be obtained as a by-product from Oxygen 18 production process. It is desirable to provide systems and methods suitable for industrial-scale production of deuterium depleted water.

The disclosed system and method are directed to solve one or more problems set forth above and other problems in the art.

BRIEF SUMMARY OF THE DISCLOSURE

As disclosed, by-product hydrogen generated from a chlor-alkali process may be used to produce high quality deuterium depleted water (e.g., with low concentration) in mass production. In the chlor-alkali process, the electrolysis of salt water (e.g., sodium chloride) is conducted in a chlor-alkali electrolysis cell to generate sodium hydroxide, hydrogen, and chlorine. A boiler is used for combusting the generated hydrogen, which provides a flue gas. The flue gas from the boiler includes water steam having a low deuterium concentration in the range of 40 ppm-60 ppm. The flue gas is introduced into a cooling condensation apparatus. After the exhaust gas is discharged, the water steam is condensed into deuterium depleted water having a desirably low deuterium concentration of about 37 ppm.

One aspect or embodiment of the present disclosure includes a system for producing deuterium depleted water. The system includes a chlor-alkali electrolysis cell, a compressor, a cooling water scrubber, a hydrogen combustor, a boiler, a cooling condensing apparatus, a crude deuterium depleted water storage tank, a water purification apparatus and a water filling machinery. The chlor-alkali electrolysis cell is configured to generate hydrogen from a chlor-alkali electrolysis of salt water in a chlor-alkali electrolysis cell for the chlor-alkali production. The compressor is connected to the chlor-alkali electrolysis cell and is configured to increase the pressure of generated hydrogen for being transferred. The cooling water scrubber is connected to the compressor and is configured to purify hydrogen and reduce the temperature of hydrogen. The hydrogen combustor is connected to the cooling water scrubber through a pipe and configured to mix the generated hydrogen with oxygen. The boiler is connected to the hydrogen combustor and is configured to combust hydrogen with oxygen to generate water steam. The cooling condensation apparatus is connected to the boiler and is configured to cool and condense the water steam to produce crude deuterium depleted water. The crude deuterium depleted water storage tank is connected to the cooling condensation apparatus and is configured to store the produced crude deuterium depleted water. The water purification apparatus is connected to the crude deuterium depleted water storage tank and is configured to purify the crude deuterium depleted water. The water filling machinery is connected to the water purification apparatus and is configured to receive and to can the purified deuterium depleted water.

Another aspect or embodiment of the present disclosure includes a method for producing deuterium depleted water. The method includes: generating hydrogen from a chlor-alkali electrolysis of salt water in a chlor-alkali electrolysis cell; increasing the pressure of the generated hydrogen in the compressor for being transferred into the cooling water scrubber; purifying hydrogen and cryogenically cooling hydrogen in the cooling water scrubber for reducing the temperature of hydrogen; transferring hydrogen into a hydrogen combustor through a pipe; mixing hydrogen with oxygen in the hydrogen combustor; combusting hydrogen with oxygen in a boiler being directly connected to the hydrogen combustor to generate water steam; cooling and condensing the water steam in a cooling condensation apparatus to produce crude deuterium depleted water; storing the produced crude deuterium depleted water in a crude deuterium depleted water storage tank; purifying the stored crude deuterium depleted water through a water purification apparatus; and canning the purified deuterium depleted water with a water filling machinery.

Other aspects of the present disclosure can be understood by those skilled in the art in light of the description, the claims, and the drawings of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

By using the disclosed systems and methods, high quality deuterium depleted water can be generated with low energy consumption and low production cost. A large amount of deuterium depleted water can be produced from by-product hydrogen generated from chlor-alkali processes in industrial mass production, which can further improve the quality of people's drinking water and satisfy public needs for deuterium depleted water with social and economic advantages.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Wherever possible, the same reference numbers will be used throughout the drawings to refer to the same or like parts. It should be understood that the exemplary embodiments described herein are only intended to illustrate and explain the present invention and not to limit the invention.

Figure 1:
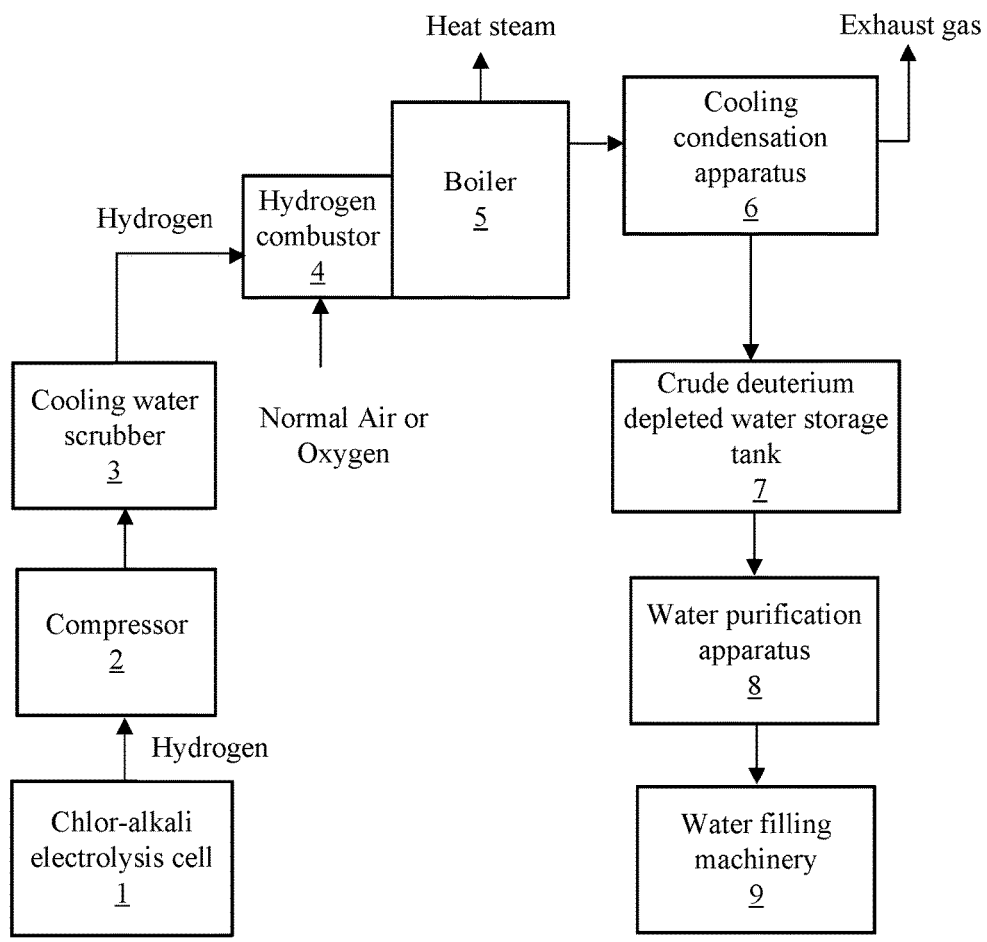
FIG. 1 depicts an exemplary system for producing deuterium depleted water according to various embodiments of the present disclosure.

FIG. 1 depicts an exemplary system for producing deuterium depleted water according to various embodiments of the present disclosure.

The system may include a chlor-alkali electrolysis cell 1, a compressor 2, a cooling water scrubber 3, a hydrogen combustor 4, a boiler 5, a cooling condensation apparatus 6, a crude deuterium depleted water storage tank 7, a water purification apparatus 8, and a water filling machinery 9.

The chlor-alkali electrolysis cell 1 is configured to conduct a chlor-alkali process which generates hydrogen as a by-product from the chlor-alkali electrolysis of salt water. The compressor 2 is connected to the chlor-alkali electrolysis cell 1 and is configured to increase the pressure of the generated hydrogen. The cooling water scrubber 3 is connected to the compressor 2 and is configured to remove impurities in the hydrogen and reduce the temperature of the hydrogen. The hydrogen combustor 4 is connected to the cooling water scrubber 3 through a pipe and configured to mix the generated hydrogen with oxygen. The boiler 5 is directly connected to the hydrogen combustor 4 and is configured to combust the hydrogen with the oxygen to generate water steam. The cooling condensation apparatus 6 is connected to the boiler 5 and is configured to cool and condense the water steam generated by the combustion of hydrogen and oxygen for producing the crude deuterium depleted water.

The crude deuterium depleted water storage tank 7 is connected to the cooling condensation apparatus 6 and configured to store the produced crude deuterium depleted water. Further, the cooling condensation apparatus 6 can include a cooling process, a condensing process and a re-condensing process or can include a cooling process and a condensing process. The water purification apparatus 8 is connected to the crude deuterium depleted water storage tank 7 and configured to purify the crude deuterium depleted water by performing one or more processes of dechlorination, sand filtration, carbon filtration, microfiltration, ultrafiltration, reverse osmosis, refined filtration, electrodeionization (EDI), and sterilization. The dechlorination can be conducted by adding reducing agents to remove the chlorine residuals in the deuterium depleted water. The electrodeionization can be utilized as a depth desalination to remove ions in the deuterium depleted water.

The water filling machinery 9 is connected to the water purification apparatus 8 and configured to receive and can the purified deuterium depleted water.

Figure 2:
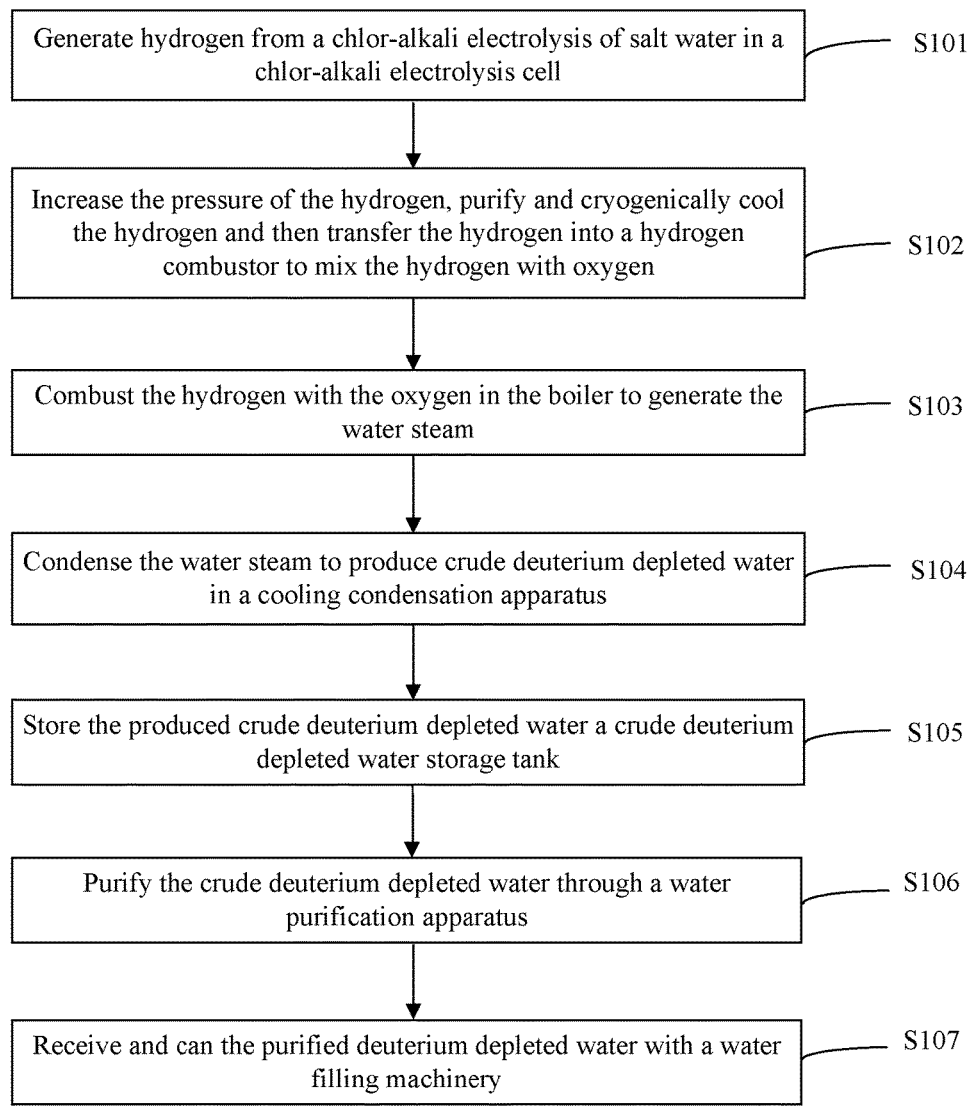
FIG. 2 depicts an exemplary method for producing deuterium depleted water according to various embodiments of the present disclosure.

FIG. 2 depicts an exemplary method for producing deuterium depleted water according to various embodiments of the present disclosure.

In step S101, hydrogen is generated as a by-product from a chlor-alkali process. Chlor-alkali electrolysis of salt water is conducted in a chlor-alkali electrolysis cell 1.

In step S102, the generated hydrogen is sent to the compressor 2 for increasing the pressure of the hydrogen and then is purified and cryogenically cooled in the cooling water scrubber 3. The purified hydrogen is then transferred into a hydrogen combustor 4 through a pipe and is mixed with oxygen in a hydrogen combustor 4.

In step S103, the hydrogen with the oxygen is combusted to generate water steam in the boiler 5 being directly connected to the hydrogen combustor 4. The oxygen can be from air or can be oxygen in the range of 21% to 100%. The reaction of hydrogen and oxygen occurred in the boiler 5 can be the reaction between oxygen and hydrogen, the reaction between air and hydrogen, or the catalytic reaction between hydrogen and oxygen to generate water steam.

In step S104, the heat released during the combustion is used for producing water steam and the water steam generated is condensed in a cooling condensation apparatus 6 to produce the crude deuterium depleted water.

In step S105, the generated crude deuterium depleted water is stored in a crude deuterium depleted water storage tank 7.

In step S106, the stored deuterium depleted water is processed through a water purification apparatus 8 to perform one or more processes including dechlorination, sand filtration, carbon filtration, microfiltration, ultrafiltration, reverse osmosis, refined filtration, electrodeionization, and sterilization. The dechlorination can be conducted by adding reducing agents to remove the chlorine residuals in the deuterium depleted water. The electrodeionization can be utilized as a depth desalination to remove ions in the deuterium depleted water.

In step S107, the purified deuterium depleted water can be canned by the water filling machinery 9 and ready to be sold in the market.

In one embodiment of the present disclosure, the generated by-product hydrogen from the chlor-alkali electrolysis cell 1 can be sent to the compressor 2 for increasing the pressure before being transferred into the cooling water scrubber. The high pressure hydrogen can be washed and cryogenically cooled in the cooling water scrubber before being transferred into the hydrogen combustor 4 where hydrogen can be mixed with oxygen in the air. Further, the hydrogen with the oxygen can be combusted in the boiler 5. The heat released from the combustion between hydrogen and oxygen can be used for generating water steam and the generated water steam and the residual air can be cooled, condensed and/or re-condensed in a cooling condensation apparatus 6 to produce the crude deuterium depleted water. The generated crude deuterium depleted water can be stored in a crude deuterium depleted water storage tank 7 and can further be processed and purified through a water purification apparatus 8 which can perform one or more processes including dechlorination, carbon filtration, microfiltration, ultrafiltration, reverse osmosis, refined filtration, electrodeionization (EDI) device, and sterilization. The purified deuterium depleted water can be received and canned by the water filling machinery 9 and ready to be sold in the market.

In another embodiment of the present disclosure, the generated by product hydrogen from the chlor-alkali electrolysis cell 1 can be sent to the compressor 2 for increasing the pressure before being transferred into the cooling water scrubber. The high pressure hydrogen can be washed and cryogenically cooled before being transferred into the hydrogen combustor 4 where hydrogen can be mixed with oxygen in the range of 21% to 100%. Further, the hydrogen with the oxygen can be combusted in the boiler 5. The heat released from the reaction between hydrogen and oxygen can be used for generating water steam and the generated water steam can be cooled, condensed and re-condensed in a cooling condensation apparatus 6 to produce the crude deuterium depleted water. The crude deuterium depleted water can be stored in a crude deuterium depleted water storage tank 7 and can further be processed and purified through a water purification apparatus 8 which can perform one or more processes including dechlorination, sand filtration, carbon filtration, microfiltration, ultrafiltration, reverse osmosis, refined filtration, electrodeionization, and sterilization. The purified deuterium depleted water can be canned by the water filling machinery 9 and ready to be sold in the market.

What is claimed is:

1. A system for producing deuterium depleted water, comprising:
   a chlor-alkali electrolysis cell, configured to generate hydrogen from a chlor-alkali electrolysis of salt water;
   a compressor, connected to the chlor-alkali electrolysis cell and configured to increase a pressure of the generated hydrogen;
   a cooling water scrubber, connected to the compressor and configured to purify the generated hydrogen and reduce a temperature of the generated hydrogen;
   a hydrogen mixer, connected to the cooling water scrubber through a pipe and configured to mix the generated hydrogen with oxygen;
   a combustion boiler, connected to the hydrogen mixer and configured to combust the hydrogen with the oxygen to generate water steam;
   a cooling condensation apparatus, connected to the combustion boiler and configured to cool and condense the water steam to produce crude deuterium depleted water;
   a crude deuterium depleted water storage tank, connected to the cooling condensation apparatus and configured to store the produced crude deuterium depleted water;
   a water purification apparatus, connected to the crude deuterium depleted water storage tank and configured to purify the crude deuterium depleted water; and
   a water filling machinery, connected to the water purification apparatus and configured to receive and to can the purified deuterium depleted water.

2. The system according to claim 1, wherein:
   the cooling condensation apparatus is configured to conduct a cooling process, a condensing process and a re-condensing process.

3. The system according to claim 1, wherein:
   the cooling condensation apparatus is configured to conduct a cooling process and a condensing process.

4. The system according to claim 1, wherein:
   the water purification apparatus is configured to purify the crude deuterium depleted water by one or more processes including dechlorination, sand filtration, carbon filtration, microfiltration, ultrafiltration, reverse osmosis, refined filtration, electrodeionization (EDI), and sterilization.

5. A method for producing deuterium depleted water, comprising:
   generating hydrogen from a chlor-alkali electrolysis of salt water in a chlor-alkali electrolysis cell;
   increasing a pressure of the generated hydrogen by a compressor connected with the chlor-alkali electrolysis cell, for being transferred into a cooling water scrubber connected with the compressor;
   scrubbing the hydrogen with cooling water in the cooling water scrubber to purify hydrogen and cryogenically reduce a temperature of hydrogen;
   transferring hydrogen into a hydrogen mixer connected to the cooling water scrubber through a pipe;
   mixing hydrogen with oxygen in the hydrogen mixer;
   combusting hydrogen with oxygen in a combustion boiler directly connected to the hydrogen mixer to generate water steam;
   cooling and condensing the water steam in a cooling condensation apparatus connected with the combustion boiler to produce crude deuterium depleted water;
   storing the produced crude deuterium depleted water in a crude deuterium depleted water storage tank connected with the cooling condensation apparatus;
   purifying the stored crude deuterium depleted water through a water purification apparatus connected with the crude deuterium depleted water storage tank; and
   canning the purified deuterium depleted water with a water filling machinery connected with the water purification apparatus.

6. The method according to claim 5, wherein the oxygen is from oxygen in air or oxygen in the range of 21% to 100%.

7. The method according to claim 5, wherein cooling and condensing the water steam is performed by conducting a cooling process, a condensing process and a re-condensing process, or by conducting a cooling process and a condensing process.

8. The method according to claim 5, wherein:
the combustion of the hydrogen with the oxygen in the combustion boiler includes a reaction between the hydrogen and oxygen in the range of 21% to 100%, a reaction between the hydrogen and oxygen in air, or a catalytic reaction between the hydrogen and the oxygen.

9. The method according to claim 5, wherein purifying the crude deuterium depleted water comprises one or more processes of dechlorination, sand filtration, carbon filtration, microfiltration, ultrafiltration, reverse osmosis, refined filtration, electrodeionization (EDI), and sterilization; wherein
the dechlorination is conducted by adding reducing agents to remove the chlorine residuals in the deuterium depleted water; and
the electrodeionization is utilized as a depth desalination to remove ions in the deuterium depleted water.

* * * * *